United States Patent [19]

Cooper et al.

[11] Patent Number: 5,995,140
[45] Date of Patent: *Nov. 30, 1999

[54] SYSTEM AND METHOD FOR SYNCHRONIZATION OF MULTIPLE VIDEO CAMERAS

[75] Inventors: Alan Neal Cooper; David William Bauerle, both of Coppell, Tex.

[73] Assignee: Ultrak, Inc., Carrollton, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/519,880

[22] Filed: Aug. 28, 1995

[51] Int. Cl.$^6$ ...................................................... H04N 7/18
[52] U.S. Cl. ........................... 348/159; 348/153; 348/212; 348/512
[58] Field of Search ..................................... 348/153, 159, 348/151, 154, 516, 705, 211–214, 155, 512; H04N 7/18, 5/225

[56] References Cited

U.S. PATENT DOCUMENTS

| | | | |
|---|---|---|---|
| 3,580,998 | 5/1971 | Hammond et al. | 178/6.8 |
| 3,811,008 | 5/1974 | Lee | 178/6.6 |
| 3,900,705 | 8/1975 | Richter | 178/6.8 |
| 4,037,250 | 7/1977 | McGahan et al. | 358/108 |
| 4,051,524 | 9/1977 | Baxter | 358/108 |
| 4,091,422 | 5/1978 | Amster | 358/210 |
| 4,218,709 | 8/1980 | Baxter et al. | 358/181 |
| 4,298,889 | 11/1981 | Burianek et al. | 358/148 |
| 4,337,481 | 6/1982 | Mick et al. | 348/154 |
| 4,511,886 | 4/1985 | Rodriquez | 348/154 |
| 4,517,593 | 5/1985 | Keller et al. | 358/107 |
| 4,577,344 | 3/1986 | Warren et al. | 382/1 |
| 4,603,352 | 7/1986 | Kaneta et al. | 358/148 |
| 4,700,230 | 10/1987 | Pshtissky | 358/181 |
| 4,814,869 | 3/1989 | Oliver, Jr. | 358/108 |
| 4,920,371 | 4/1990 | Kaneko | 354/410 |
| 4,943,854 | 7/1990 | Shiota et al. | 358/108 |
| 4,943,864 | 7/1990 | Elberbaum | 358/108 |
| 4,945,417 | 7/1990 | Elberbaum | 358/210 |
| 4,949,181 | 8/1990 | Elberbaum | 358/210 |
| 4,954,886 | 9/1990 | Elberbaum | 358/86 |
| 4,977,449 | 12/1990 | Morgan | 358/86 |
| 4,989,085 | 1/1991 | Elberbaum | 358/108 |

(List continued on next page.)

FOREIGN PATENT DOCUMENTS

| | | |
|---|---|---|
| 2704379-A1 | 4/1993 | France . |
| 357079781A | 5/1982 | Japan . |
| 7079781 | 5/1982 | Japan ............................. H04N 5/22 |
| 2-109198 | 4/1990 | Japan . |
| 4-192780 | 7/1992 | Japan . |
| 4287488 | 10/1992 | Japan ............................. H04N 7/18 |
| 406197344 | 7/1994 | Japan . |

OTHER PUBLICATIONS

Elbex, Ltd., Catalog, Serial Video Series, Oct. 1995.
Elbex, Ltd., Catalog, Framelock Series, Oct. 1993.
Elbex, Ltd., What Is I–D–Code?, Nov. 1995.

*Primary Examiner*—Michael H. Lee
*Attorney, Agent, or Firm*—George R. Schultz; Akin, Gump, Strauss, Hauer & Feld, LLP

[57] ABSTRACT

A plurality of video cameras provide video signals to a video switcher of a video controller. The video switcher selects a video signal of one of the video cameras as the output video based upon a camera control code sent to the video switcher by a timing controller of the video controller. A video synchronization separator of the video controller reads the vertical synchronization interval and the horizontal synchronization pulse from the output video signal and sends those synchronization signals to the timing control. The timing controller generates a vertical drive signal having a plurality of vertical drive pulses that are timed with the vertical synchronization intervals from the video synchronization separator. The timing controller also generates a horizontal drive signal having horizontal drive pulses that are timed with the horizontal synchronization pulses from the video synchronization separator.

19 Claims, 5 Drawing Sheets

U.S. PATENT DOCUMENTS

| | | | |
|---|---|---|---|
| 5,001,473 | 3/1991 | Ritter et al. | 340/825.52 |
| 5,226,066 | 7/1993 | Barr | 378/99 |
| 5,237,408 | 8/1993 | Blum et al. | 358/108 |
| 5,239,376 | 8/1993 | Dittmann et al. | 358/101 |
| 5,243,425 | 9/1993 | Thompson | 358/148 |
| 5,249,051 | 9/1993 | Elberbaum et al. | 358/148 |
| 5,262,869 | 11/1993 | Hong | 348/211 |
| 5,264,929 | 11/1993 | Yamaguchi | 358/108 |
| 5,267,039 | 11/1993 | Elberbaum | 358/146 |
| 5,274,450 | 12/1993 | Elberbaum | 358/149 |
| 5,283,649 | 2/1994 | Elberbaum et al. | 348/500 |
| 5,293,231 | 3/1994 | Elberbaum et al. | 348/521 |
| 5,335,014 | 8/1994 | Elberbaum | 348/159 |
| 5,361,096 | 11/1994 | Ohki et al. | 348/387 |
| 5,371,535 | 12/1994 | Takizawa | 348/15 |
| 5,389,968 | 2/1995 | Koyanagi et al. | 348/211 |
| 5,438,362 | 8/1995 | Tabuchi | 348/211 |
| 5,479,206 | 12/1995 | Ueno et al. | 348/211 |
| 5,508,737 | 4/1996 | Lang | 348/159 |
| 5,550,584 | 8/1996 | Yamada | 348/153 |
| 5,579,060 | 11/1996 | Elberbaum | 348/705 |
| 5,583,796 | 12/1996 | Reese | 364/550 |
| 5,586,796 | 12/1996 | Johnson et al. | 364/550 |
| 5,621,729 | 4/1997 | Reese | 370/62 |
| 5,675,738 | 10/1997 | Suzuki et al. | 395/200.09 |
| 5,696,553 | 12/1997 | D'Alfonso et al. | 348/211 |

SYSTEM AND METHOD FOR SYNCHRONIZATION OF MULTIPLE VIDEO CAMERAS

BACKGROUND

The present invention relates to video camera systems, and more particularly, to synchronizing video signals of two or more video cameras.

A video camera transmits fields or frames of video which comprise lines of video. Each field of video is synchronized to one of a series of vertical synchronization intervals. Each line of video is synchronized to one of a series of horizontal synchronization pulses. The video camera uses an oscillator to generate the vertical synchronization intervals and the horizontal synchronization pulses.

Because each video camera uses a different oscillator, the vertical synchronization pulse and the horizontal synchronization intervals in each camera will be at a different frequency. A minor difference in the frequency of the vertical synchronization intervals or and the horizontal synchronization pulses of various video cameras can cause a disruption in the video picture when multiplexing between the various video cameras. Therefore, there is a need for systems which synchronize the vertical synchronization intervals and the horizontal synchronization pulses of more than one camera.

SUMMARY

In one embodiment, the present invention is a system for providing a drive signal to a plurality of video cameras which includes a video switcher for receiving video signals from each of the plurality of cameras and selecting a video signal from one of the plurality of video cameras for a video output, and a video synchronization separator for reading synchronization signals from the video output of the video switcher and sending the synchronization signals to the plurality of video cameras as the drive signal. In a further embodiment, the system further includes a timing control which receives the synchronization signals from the video synchronization separator and generates the drive signals which are sent to the video cameras at a predetermined time delay from when the synchronization signals are received from the video synchronization separator.

In another embodiment, the present invention is a method of providing a drive signal to a plurality of video cameras, comprising the steps of providing video signals from the plurality of video cameras, selecting a video signal from one of the plurality of video cameras as an output video signal, reading synchronization pulses from the output video signal, sending the synchronization pulses from the output video signal to the plurality of cameras as the drive signal. In a further embodiment, the step of sending the synchronization pulses includes sending the synchronization pulses to a timing control which passes those signals to the plurality of cameras as a drive signal after a predetermined time delay.

BRIEF DESCRIPTION OF THE DRAWINGS

These and other features, aspects and advantages of the present invention will become better understood with regard to the following description, appended claims and accompanying drawings where:

DETAILED DESCRIPTION

Figure 1:
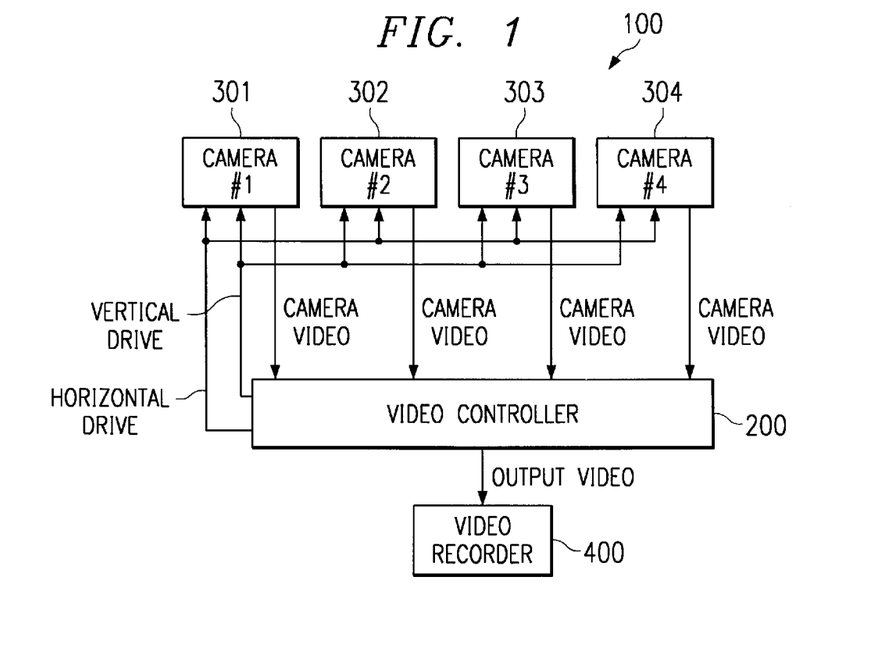
FIG. 1 illustrates a block diagram of a system utilizing the present invention for the synchronization of multiple cameras.

Referring now to the drawings, there is shown a multiple video camera system 100 utilizing an embodiment of the present invention. The multiple video camera system 100 generally comprises a video controller 200, video cameras 301, 302, 303, and 304, and a video recorder 400. The video controller 200 receives a camera video signal from each of the video cameras 301, 302, 303, and 304. Each of the video cameras 301, 302, 303, and 304 receive a vertical drive signal 600 from the video controller 200. Each of the video cameras 301, 302, 303, and 304 receive a horizontal drive signal 700 from the video controller 200. The video controller 200 multiplexes the camera video signals from the various cameras 301, 302, 303, and 304 and sends an output video signal to the video recorder 400.

Figure 2:
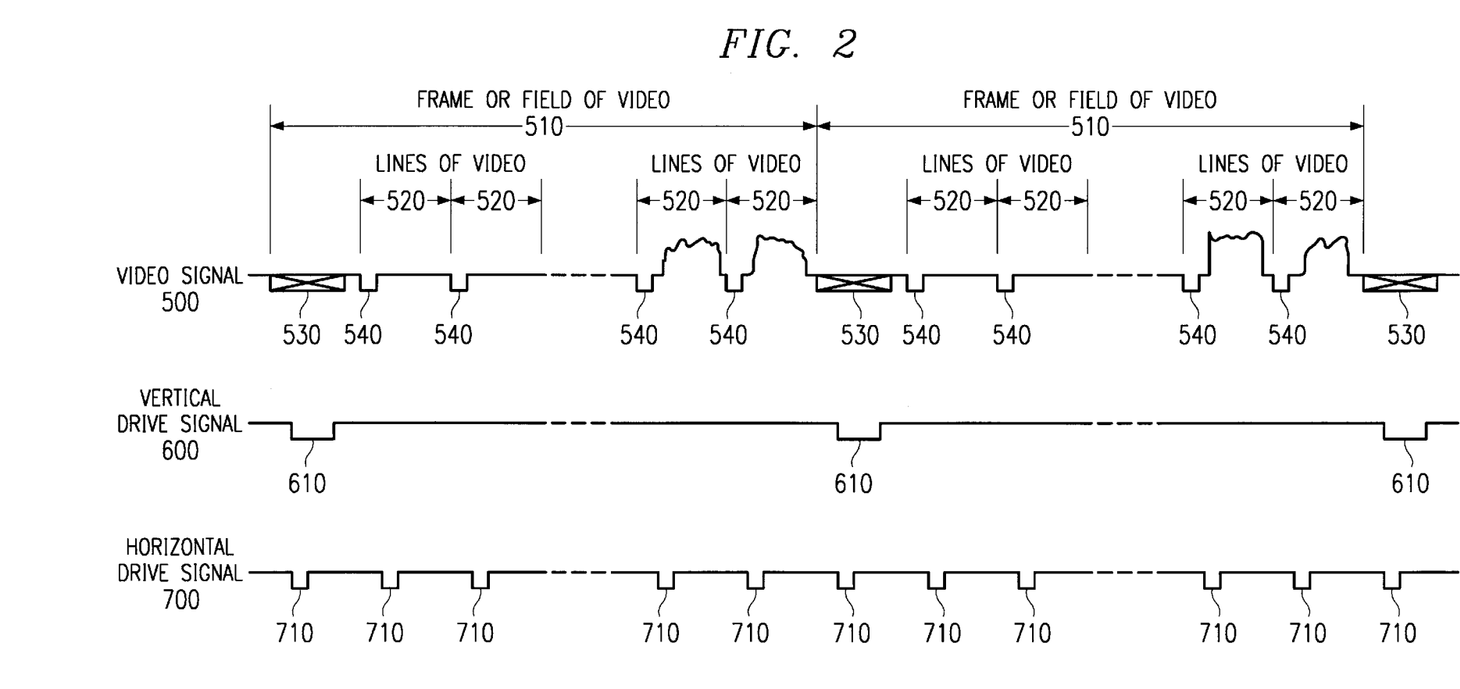
FIG. 2 illustrates frames of video and lines of video from the video signal of one of the video cameras in FIG. 1, and a vertical drive signal and a horizontal drive signal from the video is controller in FIG. 1.

The video cameras 301, 302, 303, and 304, each produce a camera video signal which is a video signal 500 comprised of fields or frames of video 510 having lines of video 520. Each of the cameras 301, 302, 303, and 304 have oscillator (not shown) which the cameras 301, 302, 303, and 304 use to generate vertical synchronization intervals 530 and horizontal synchronization pulses 540 for the video signal 500 of the particular video camera 301, 302, 303, and 304. Each of the video cameras 301, 302, 303, and 304 synchronize the fields of video 510 and lines of video 520 to the vertical synchronization intervals 530 and the horizontal synchronization pulses 540, respectively, for the video signal 500 of the particular camera 301, 302, 303, and 304 selected by the video controller 200 as the output video signal from the video controller 200.

Figure 3:
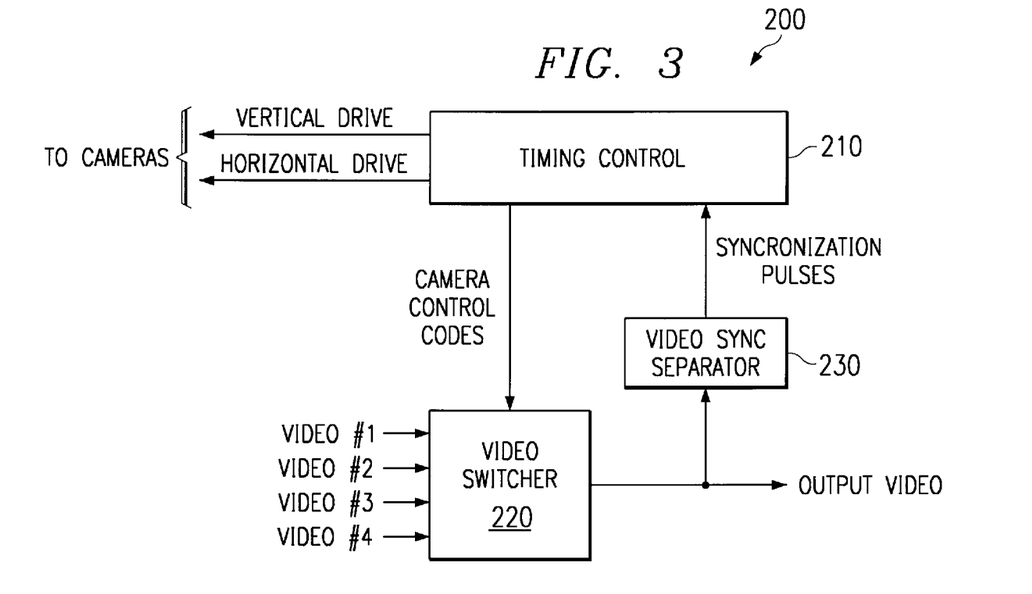
FIG. 3 illustrates a block diagram of the video controller from FIG. 1.

The video controller 200 generally comprises a timing control 210, a video switcher 220, and a video synchronization separator 230. The timing control 210 generates camera control codes which are sent to the video switcher 220. The video switcher 220 receives the camera video signals from the video cameras 301, 302, 303, and 304. The video switcher 220 selects the video signal 500 from one of the cameras 301, 302, 303, or 304 to be the output video signal of the video controller 200 based upon the camera control codes from the timing control 210. The timing control 210 can be programmed to generate the camera control codes which cause the video switcher 220 to select the video signal 500 from a particular one of the video cameras 301, 302, 303, or 304 based upon a pre-determined time period and order, a varying time period and order, upon sensing a change in an input condition, or the like. The video signal 500 selected by the video switcher 220 from one of the video cameras 301, 302, 303, or 304 is the output video signal sent from the video controller 200 to the video recorder 400. Although the multiple video camera system 100 shown in FIG. 1 illustrates the video controller 200 sending the output video to the video recorder 400, a person of ordinary skill in the art will understand that the output video of the video controller 200 can also be transmitted to a display device, a computer, or any other system adapted to use a video camera signal.

The output video signal of video switcher 220 is also received by the video synchronization separator 230. The video synchronization separator 230 reads the vertical synchronization intervals 530 and the horizontal synchronization pulses 540 of the video signal 500 from the video switcher 220, and sends respective synchronization pulses to the timing control 210. The timing control 210 uses the vertical synchronization intervals 530 and the horizontal synchronization pulses 540 of the video signals 500 from the video selector 220 to create vertical drive pulses 610 of the vertical drive signal 600 and horizontal drive pulses 710 of the horizontal drive signal 700, respectively, that are sent to the cameras 301, 302, 303, and 304 by the video controller 200. The vertical drive pulses 610 of the vertical drive signal 600 and horizontal drive pulses 710 of the horizontal drive signal 700 are aligned with the vertical synchronization intervals 530 and the horizontal synchronization pulses 540, respectively, from the video signal 500 of the camera 301, 302, 303, or 304 that is selected by the video switcher 220 to be the output video signal of the video controller 200.

Figure 4:
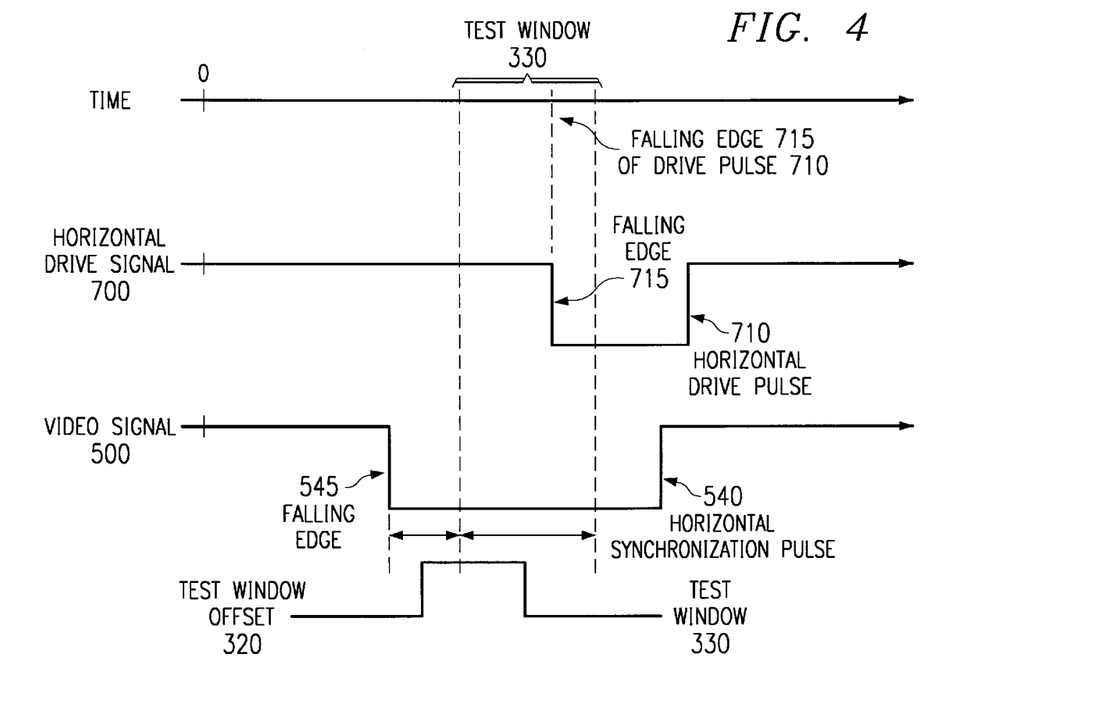
FIG. 4 illustrates the comparison by one of the video cameras from FIG. 1 of the horizontal drive signal to the horizontal synchronization pulse, with the falling edge of the horizontal drive pulse within a horizontal test window.
Figure 5:
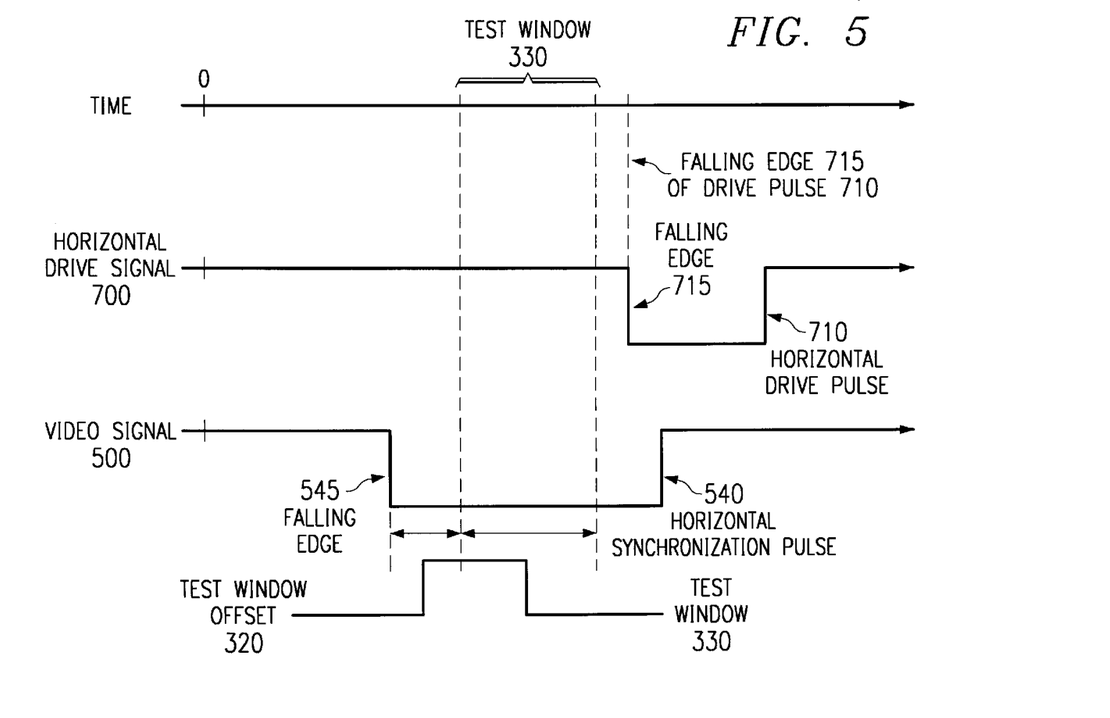
FIG. 5 illustrates the comparison by one of the video cameras from FIG. 1 of the horizontal drive signal to the horizontal synchronization pulse, with the falling edge of the horizontal drive signal pulse outside of a horizontal test window.

Each of the cameras 301, 302, 303, and 304 are a video camera that is capable of external synchronization. In one embodiment, the video cameras 301, 302, 303, and 304 are model XE-75 manufactured by the SONY Corporation. Video cameras capable of external synchronization maintain the timing control of the camera within a predetermined time period of the drive pulses of the drive signal. If the timing control of a camera capable of external synchronization exceeds an allowable variation from the drive signal, the camera will reset the counter of the timing control in the camera. For example, the cameras 301, 302, 303, and 304 will compare the horizontal drive pulse 710 of the horizontal drive signal 700 with the horizontal synchronization pulse 540 of the video signal 500 for the particular camera to determine if the horizontal counter of the timing control in the particular camera must be reset. The particular camera 301, 302, 303, or 304, will view the horizontal drive pulse 710 to determine if the falling edge 715 of the horizontal drive pulse occurs during a horizontal test window 330 located after a horizontal test window offset 320 from the falling edge 545 of the horizontal synchronization pulse 540. If a falling edge 715 of the horizontal drive pulse 710 occurs during the test window 330, the timing control of the particular video camera is not reset. However, if the falling edge 715 of the horizontal drive pulse 710 does not occur during the test window 330, the particular video camera will reset the horizontal counter of the timing control of the particular video camera. In this manner, the video cameras 301, 302, 303, and 304 each maintain their respective horizontal synchronization pulses 540 within a predetermined range of the horizontal drive pulses 710 of the horizontal drive signal 700. In the same way, the cameras 301, 302, 303, and 304 will compare the vertical drive pulse 610 of the vertical drive signal 600 with the vertical synchronization intervals 530 of the video signal 500 to determine if the vertical counter of the timing control in the particular camera must be reset. In this manner, the cameras 301, 302, 303, and 304 will also each maintain their respective vertical synchronization intervals 530 within a predetermined range of the vertical drive pulses 610 of the vertical drive signal 600.

It can be seen from the foregoing that the camera 301, 302, 303, or 304 selected by the video switcher 220 will always be synchronized to the vertical drive signal 600 and the horizontal drive signal 700, and that the cameras not selected by the switching controller 200 will reset their respective timing controls to synchronize with the camera selected by the switching controller 220. The selected camera becomes the master and the cameras not selected are the slaves. It can also be seen that because the switching controller can select different cameras 301, 302, 303, or 304, the master camera will change or roam between the various cameras 301, 302, 303, and 304. Although the selected camera may change, the viewed or selected camera will always be self-sychronized because the selected camera is the master that all cameras are synchronized to. Although a synchronization error may occur at the initial changing of the selected camera, the synchronization error occurs only in the beginning lines of video, which are the non-viewed lines of video.

In one embodiment, the timing control 210 sends the vertical drive pulses 610 to the cameras 301, 302, 303, and 304 at a predetermined vertical time period after the timing control 210 receives the vertical synchronization intervals 530, and at a predetermined horizontal time period after the timing control receives the horizontal synchronization pulses. The vertical and horizontal predetermined time periods compensate for the test window offsets and centers the falling edge of the drive pulses within the respective test windows of the camera 301, 302, 303, or 304 which is selected by the video switcher 220. In this manner, the video camera 301, 302, 303, or 304 selected by the video switcher 220 will not use the selected camera to reset the vertical counter or the horizontal counter of the timing control in the selected camera.

In another embodiment, the vertical synchronization intervals 530 and the horizontal synchronization pulses 540 from the video synchronization separator 230 are sent directly to the cameras 301, 302, 303, and 304 as the vertical drive pulse 610 and the horizontal drive pulse 710, respectively, without passing through the timing controller 210. The video cameras 301, 302, 303, and 304 do not have a vertical or horizontal test window offset, and the vertical and horizontal test windows of the cameras 301, 302, 303, and 304 are centered on the falling edge of the vertical synchronization intervals and the horizontal synchronization pulses, respectively, of the video cameras.

In yet another embodiment, only the horizontal drive pulses 710 of the horizontal drive signal 700 are generated by the timing controller 210 using the horizontal synchronization pulses 540 from the video synchronization separator 230. In yet even another embodiment, only the vertical drive pulses 610 of the vertical drive signal 600 are generated by the timing controller 210 using the vertical synchronization intervals 530 from the video synchronization separator 230.

Figure 6:
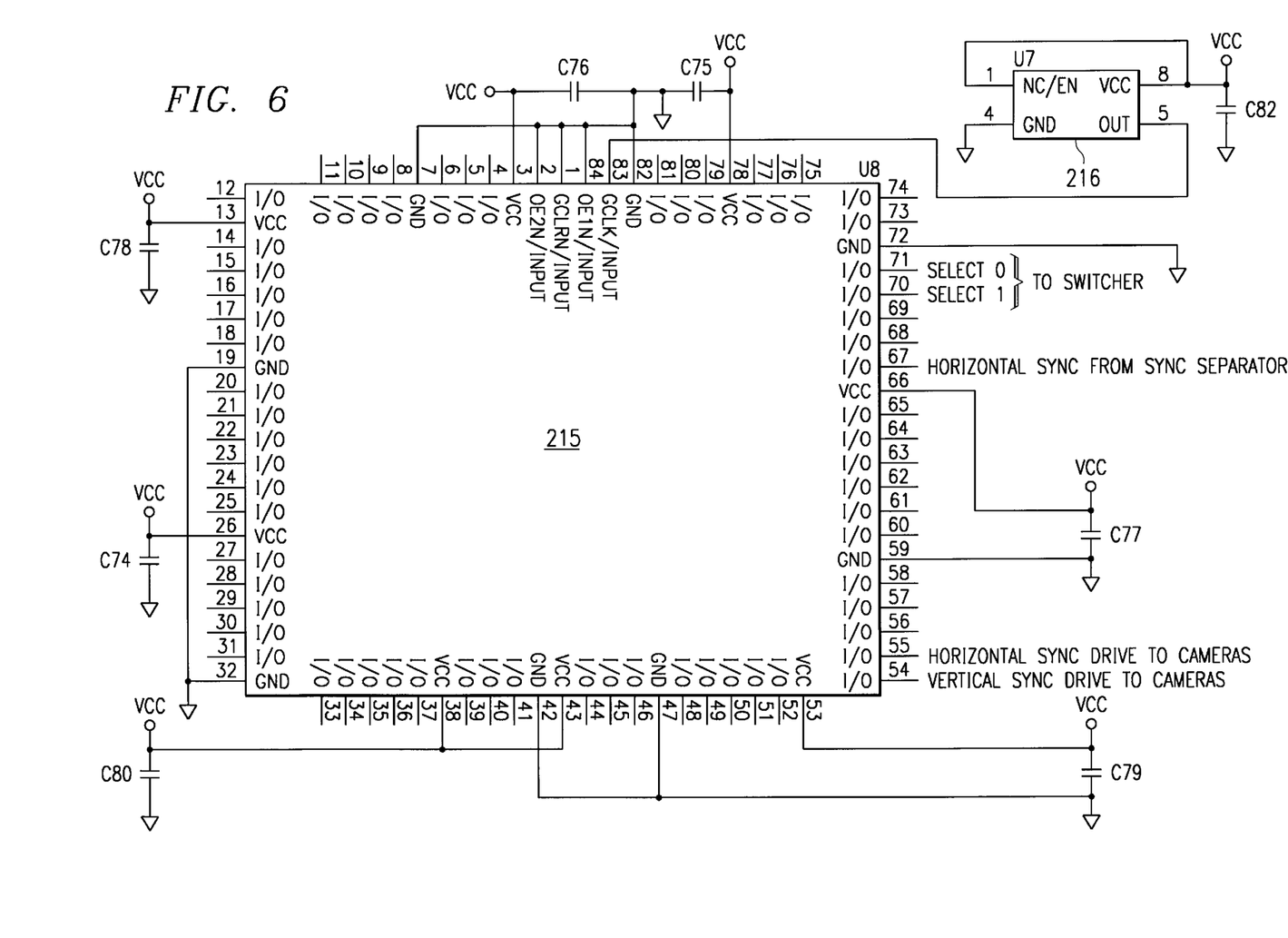
FIG. 6 shows a schematic illustrating one embodiment of the timing controller from FIG. 3.

A schematic is shown in FIG. 6 illustrating an embodiment of the timing controller 210 wherein the vertical drive pulses 610 of the vertical drive signal 600 are generated by the timing controller 210 using an oscillator 216, and the horizontal drive pulses 710 of the horizontal drive signal 700 are generated by the timing controller 210 using the horizontal synchronization pulses 540 from the video synchronization separator 230. The timing controller 210 in FIG. 1 includes a programmable logic device 215, such as the MAX EPM 7128 Programmable Logic Device manufactured by ALTERA which is located in San Jose, Calif.

Figure 7:
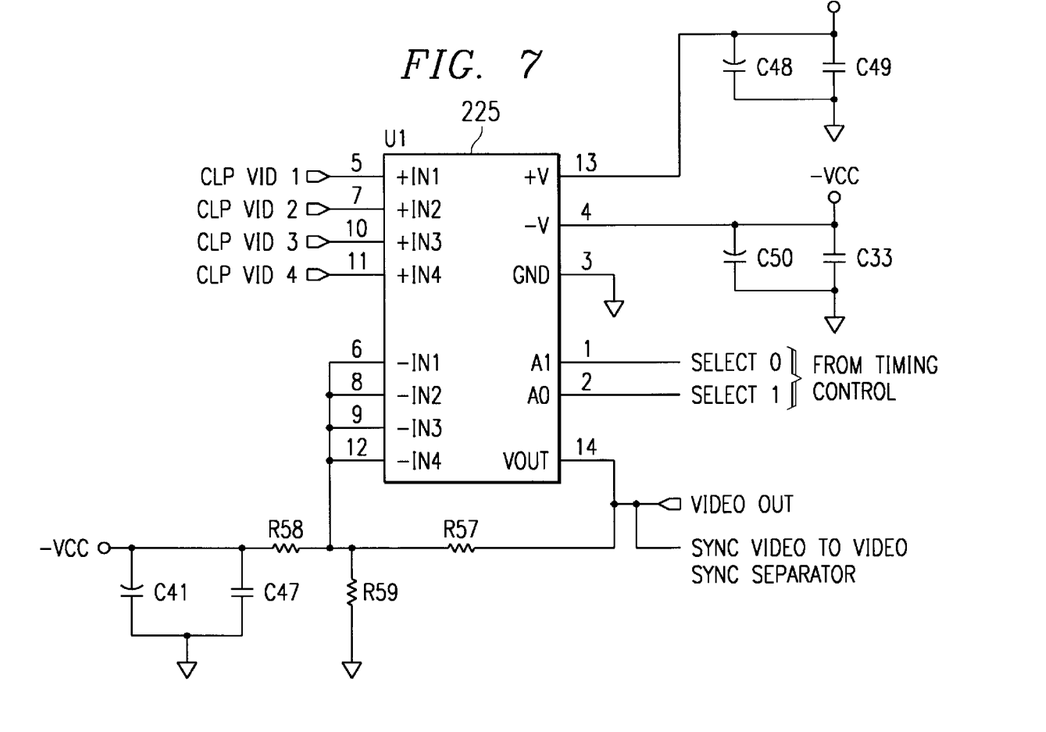
FIG. 7 shows a schematic illustrating one embodiment of the video switcher from FIG. 3.

A schematic is shown in FIG. 7 illustrating one embodiment of the video switcher 220 using a multiplexing switcher 225, such as the Multiplexed Input Video Amplifier model EL4444 manufactured by elantec which is located in Milpitas, Calif.

Figure 8:
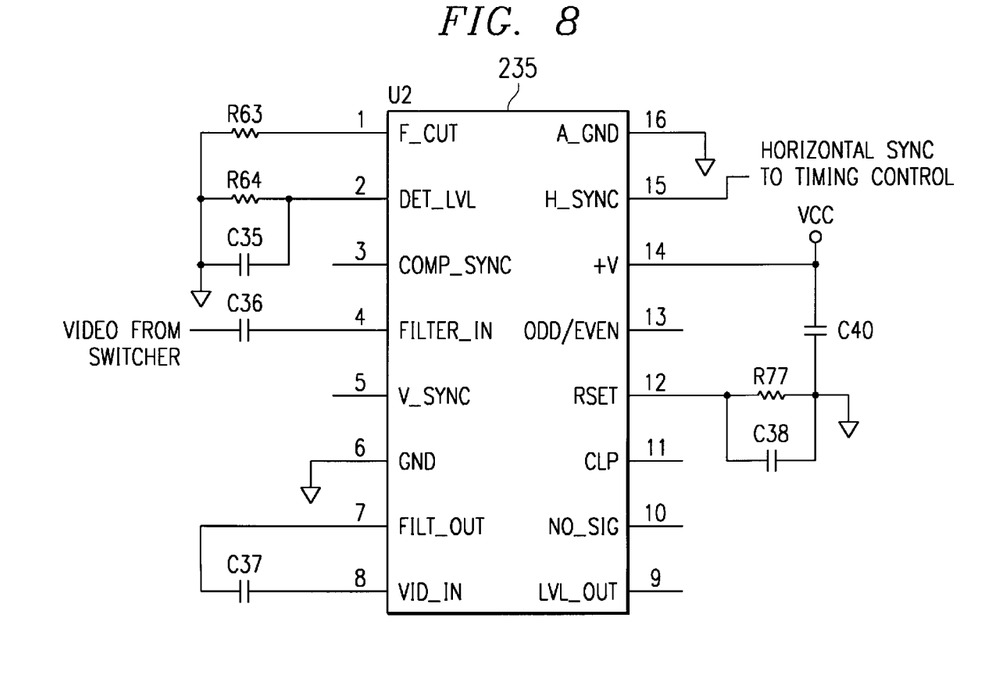
FIG. 8 shows a schematic illustrating one embodiment of the video synchronization separator from FIG. 3.

A schematic is shown in FIG. 8 illustrating one embodiment of the video synchronization separator 230 using a commercial video synchronization separator 235, such as the Video Sync Separator model EL4583C manufactured by elantec located in Milpitas, Calif.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system comprising:
 a plurality of cameras capable of external synchronization, each of said plurality of cameras including an output;
 a video switcher, connected to said output of each of said plurality of cameras, said video switcher for receiving video signals from said output of each of the plurality of cameras and selecting a video signal from one of the plurality of cameras for a video output;
 a video synchronization separator connected to said video switcher, said video synchronization separator for reading synchronization signals from the video output of said video switcher and sending the synchronization signals to each of the plurality of cameras.

2. A method of providing a drive signal to a plurality of cameras, said method comprising the steps of:
 providing video signals from the plurality of cameras;
 selecting a video signal from one of the plurality of cameras as an output video signal;
 reading synchronization signals from the output video signal; and
 sending the synchronization signals from the output video signal to the plurality of cameras as the drive signal.

3. The system according to claim 1, wherein the synchronization signals read by said video synchronization separator and sent to each of the plurality of cameras as said drive signal are horizontal synchronization signals of said video output.

4. The system according to claim 1, wherein the synchronization signals read by said video synchronization separator and sent to each of the plurality of cameras as said drive signal are vertical synchronization signals of said video output.

5. The method according to claim 2, wherein said step of selecting a video signal includes selecting the video signal from a particular one of the plurality of cameras based upon a predetermined time period and order.

6. The method according to claim 2, wherein said step of selecting a video signal includes selecting the video signal from a particular one of the plurality of cameras based upon a varying time period and order.

7. The method according to claim 2, wherein said step of selecting a video signal includes selecting the video signal from a particular one of the plurality of cameras based upon sensing a change in an input condition.

8. The method according to claim 2, wherein said step of sending the synchronization signals includes sending the synchronization signals to the plurality of cameras is the drive signal at a pre-determined time period after the synchronization signals are read from the output video signal.

9. The method according to claim 2, wherein the synchronization pulses in said step of reading synchronization signals and said step of sending the synchronization signals are horizontal synchronization signals.

10. The method according to claim 9, wherein said step of sending the synchronization signals includes sending the synchronization signals to the plurality of cameras at pre-determined horizontal time period after the synchronization signals are read from the output video signal.

11. The method according to claim 2, wherein the synchronization pulses in said step of reading synchronization signals and said step of sending the synchronization signals are vertical synchronization signals.

12. The method according to claim 11, wherein said step of sending the synchronization signals includes sending the synchronization signals to the plurality of cameras at pre-determined vertical time period after the synchronization signals are read from the output video signal.

13. A system for providing a drive signal to a plurality of cameras, said system comprising:
 a video switcher for receiving video signals from each of the plurality of cameras and selecting a video signal from one of the plurality of cameras for a video output based upon a camera control code;
 a video synchronization separator connected to said video switcher, said video synchronization separator for outputting at least a representation of synchronization signals included in the video output of said video switcher;
 a timing controller connected to said video synchronization separator, said timing controller for receiving the out-putted synchronization signals from said video synchronization separator and for sending drive signals to the plurality of cameras based on the synchronization signals outputted from said video synchronization separator, wherein said timing controller sends the drive signal to the plurality of cameras at a pre-determined time period after receiving the synchronization signals.

14. The system according to claim 13, wherein said timing controller sends the camera control code to said video switcher.

15. The system according to claim 14, wherein said timing controller sends a camera control code that causes said video switcher to select a particular one of the plurality of cameras based upon a pre-determined time period and order.

16. The system according to claim 14, wherein said timing controller sends a camera control code that causes said video switcher to select a particular one of the plurality of cameras based upon a varying time period and order.

17. The system according to claim 14, wherein said timing controller sends a camera control code that causes said video switcher to select a particular one of the plurality of cameras based upon a change in an input condition to said timing controller.

18. The system according to claim 13, wherein the synchronization signals from said video synchronization separator to said timing controller are horizontal synchronization signals, and wherein the drive signals to the plurality of cameras by said timing controller are horizontal drive signals.

19. The system according to claim 13, wherein the synchronization signals from said video synchronization separator to said timing controller are vertical synchronization signals, and wherein the drive signals to the plurality of cameras by said timing controller are vertical drive signals.

* * * * *